(12) United States Patent
Quan et al.

(10) Patent No.: US 7,760,982 B2
(45) Date of Patent: Jul. 20, 2010

(54) MOUNTING STRUCTURE

(75) Inventors: Robert A. Quan, White Plains, NY (US); Patrick T. White, Baltimore, MD (US); Michael P. Ritchey, Smithsburg, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 870 days.

(21) Appl. No.: 11/609,680

(22) Filed: Dec. 12, 2006

(65) Prior Publication Data

US 2007/0274660 A1    Nov. 29, 2007

Related U.S. Application Data

(60) Provisional application No. 60/796,372, filed on May 1, 2006.

(51) Int. Cl.
*G02B 6/00* (2006.01)
*H01R 33/945* (2006.01)

(52) U.S. Cl. ............................ 385/134; 385/92; 385/88; 385/135; 439/577

(58) Field of Classification Search ................. 385/134, 385/135, 136, 137, 138, 139, 147, 88, 89, 385/92, 93, 94; 439/577
See application file for complete search history.

(56) References Cited

U.S. PATENT DOCUMENTS

| | | | | |
|---|---|---|---|---|
| 6,065,612 A * | 5/2000 | Rinderer | ....................... | 211/26 |
| 6,223,908 B1 * | 5/2001 | Kurtsman | ..................... | 211/26 |
| 6,349,837 B1 * | 2/2002 | Serban | ......................... | 211/26 |
| 6,481,582 B1 * | 11/2002 | Rinderer | ....................... | 211/26 |
| 7,070,459 B2 * | 7/2006 | Denovich et al. | ............ | 439/719 |
| 7,385,141 B2 * | 6/2008 | Keith et al. | .................. | 174/135 |
| 7,406,241 B1 * | 7/2008 | Opaluch et al. | .............. | 385/135 |
| 2005/0233647 A1 * | 10/2005 | Denovich et al. | ............ | 439/719 |
| 2007/0274660 A1 * | 11/2007 | Quan et al. | .................. | 385/134 |

* cited by examiner

Primary Examiner—Brian M Healy

(57) ABSTRACT

A mounting structure is disclosed in a test-bed installation in which vertically aligned first backboards are pivotally secured to a front side of one of the upright posts of a relay rack for movement between a closed position and open positions. Vertically aligned second backboards are secured to a rear side of both upright posts of the relay rack in opposed relationship with the first backboards. A pair of optical network terminals is mounted on an outer side of each of the backboards, and a pair of battery backup units is mounted on an inner side thereof. Thus when one of the first backboards is moved to an open position, access is provided to the pair of battery backup units mounted on the first backboard so moved and to the pair of battery backup units mounted on the opposing second backboard.

15 Claims, 10 Drawing Sheets

MOUNTING STRUCTURE

The present application claims priority to U.S. Provisional Application No. 60/796,372, filed May 1, 2006, the entire content of which is hereby incorporated herein by reference.

TECHNICAL FIELD

A mounting structure is disclosed such as for improving installation of Optical Network Terminals (ONTs) and Battery Backup Units (BBUs) in Fiber-to-the-Premise (FTTP) test-bed installations.

BACKGROUND

A Fiber-to-the-Premise (FTTP) system is an all fiber-optic system that replaces the traditional copper cable originating in a telephone central office and terminating at the customer premise. The replacement of the legacy copper infrastructure with new fiber-optic cables not only improves service reliability but provides a vast amount of bandwidth for new and faster media services. In an FTTP system, an Optical Network Terminal (ONT) installed at the customer premise converts an optical signal from a single optical fiber originating at the telephone central office into customer services. More particularly, the ONT is capable of providing telephone, high-speed Internet, and video services.

FTTP systems are customarily tested for service reliability, provisioning, disaster recovery, feature verification, and the like prior to field deployment for providing telecommunications services to customers. In a typical FTTP test-bed installation, ONTs and Battery Backup Units (BBUs) are installed as elements of systems under test. ONTs are tested for a number of items, including but not limited to: reliability (such as call processing), features (i.e., testing of Caller ID for example), requirements verification (such as. for example, phone ringing that meets industry specifications, and voice quality), verification of high-speed Internet upstream and downstream rates, video quality, service compatibility (interoperability with various modems, set top boxes, and the like), disaster recovery, and power loss and recovery.

The BBU is the sole source of power for the ONT at the customer premise and is similar to power sources of home security systems. The BBU is normally AC powered but is provided with a twelve-volt DC battery. Should there be a commercial power outage, the BBU will switch to battery power so that the customer will continue to be provided with telephony service. When AC power is restored, the BBU will automatically switch from battery backup to AC operation.

Heretofore, the ONTs and BBUs to be tested have been mounted on a backboard in a standard central office (CO) relay rack. FIG. 1 illustrates such an ONT installation and shows a plurality of ONTs 10 mounted on a first or front side of a wooden backboard 12, the wooden backboard being secured to a standard relay rack. Upright posts 14 and 16 of the relay rack are visible to the left and right of the ONTs. One ONT 10a is shown with an access door 10b ajar.

FIG. 2 illustrates a standard prior-art BBU installation showing a plurality of BBUs 18 secured to a second or rear side of the same wooden backboard 12 of FIG. 1. Upright post 16 of the relay rack appears at the left of the BBUs. Typically, ten ONTs are mounted on the first side of the backboard and an equal number of BBUs are mounted on the second side of the backboard, each BBU being electrically associated with its respective ONT. Cabling between each pair comprising an ONT and a BBU is routed through pre-drilled openings in the backboard. With, for example, ten such pairs of ONTs and BBUs per relay rack, significant numbers of CO relay racks are required in the space allotted when a large number of such units are installed.

It would be desirable to provide a more efficient use of space by installing a consolidated mounting structure that would at least double the capacity of ONT/BBU installations.

BRIEF DESCRIPTION OF THE DRAWINGS

Features and advantages of the present mounting structure will be apparent from the following detailed description and the appended claims, taken in conjunction with the accompanying drawings, in which:

DETAILED DESCRIPTION

Figure 1:
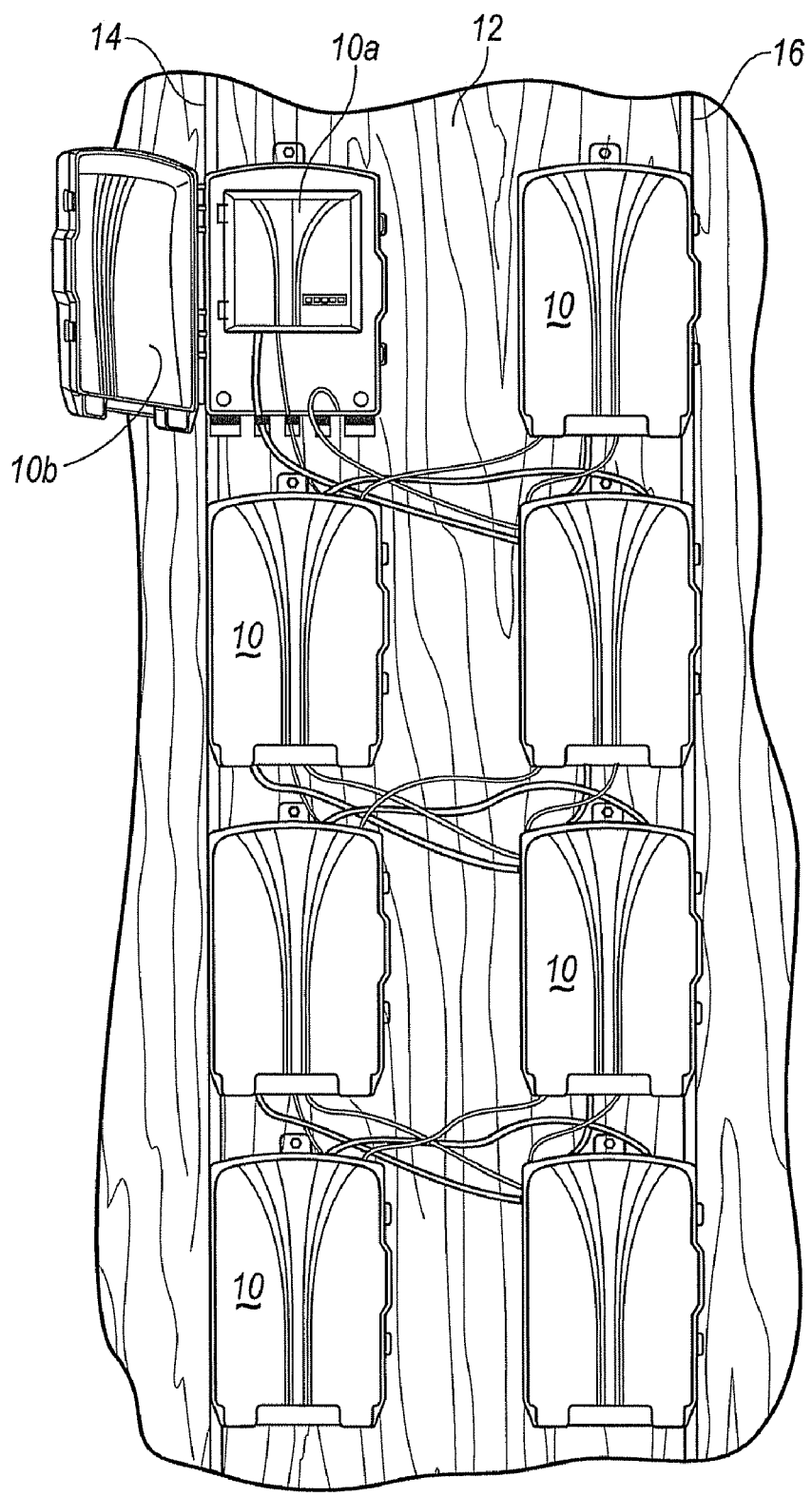
FIG. 1 is a partial elevational perspective view of a typical prior-art ONT installation, showing a plurality of ONTs secured to a first side of a wooden backboard.

Referring to FIGS. 3-10, an exemplary illustration of a mounting structure is shown. The drawings are not necessarily to scale and certain features may be exaggerated to better illustrate and explain certain innovative aspects. Many details not directly related to the mounting structure, such as the extensive cabling that would normally be found in a typical Fiber-to-the-Premise (FTTP) test-bed installation, have been omitted entirely from the drawings in the interests of clarity and simplicity. Several different configurations of Optical Network Terminals (ONTs) and Battery Backup Units (BBUs) have been represented in the drawings to demonstrate that the present mounting structure is not limited in application to a single type of each. Further, the example shown and described herein is not intended to be exhaustive or otherwise limiting, nor is it restricted to the precise form and configuration shown in the drawings and disclosed in the following detailed description.

Referring now to FIGS. 3 to 10, an exemplary mounting structure is illustrated. The mounting structure provides a consolidated solution for mounting electrically operable units such as ONTs and electric power units such as BBUs. It permits doubling, the number of each that can be installed in a standard relay rack. This is accomplished by including, in the mounting structure mounting plates or backboards hingedly secured to at least a front or rear side of the relay rack. By way of example, relay racks are described in U.S. Pat. No. 6,481,582, filed Jun. 4, 2001; U.S. Pat. No. 6,349,837, filed Nov. 10, 2000; U.S. Pat. No. 6,301,837, filed Oct. 16, 2001; U.S. Pat. No. 6,223,908, filed Sep. 15, 1999; and U.S. Pat. No. 6,065,612, filed Apr. 23, 1999, which are herein incorporated by reference in their entireties.

Figure 3:
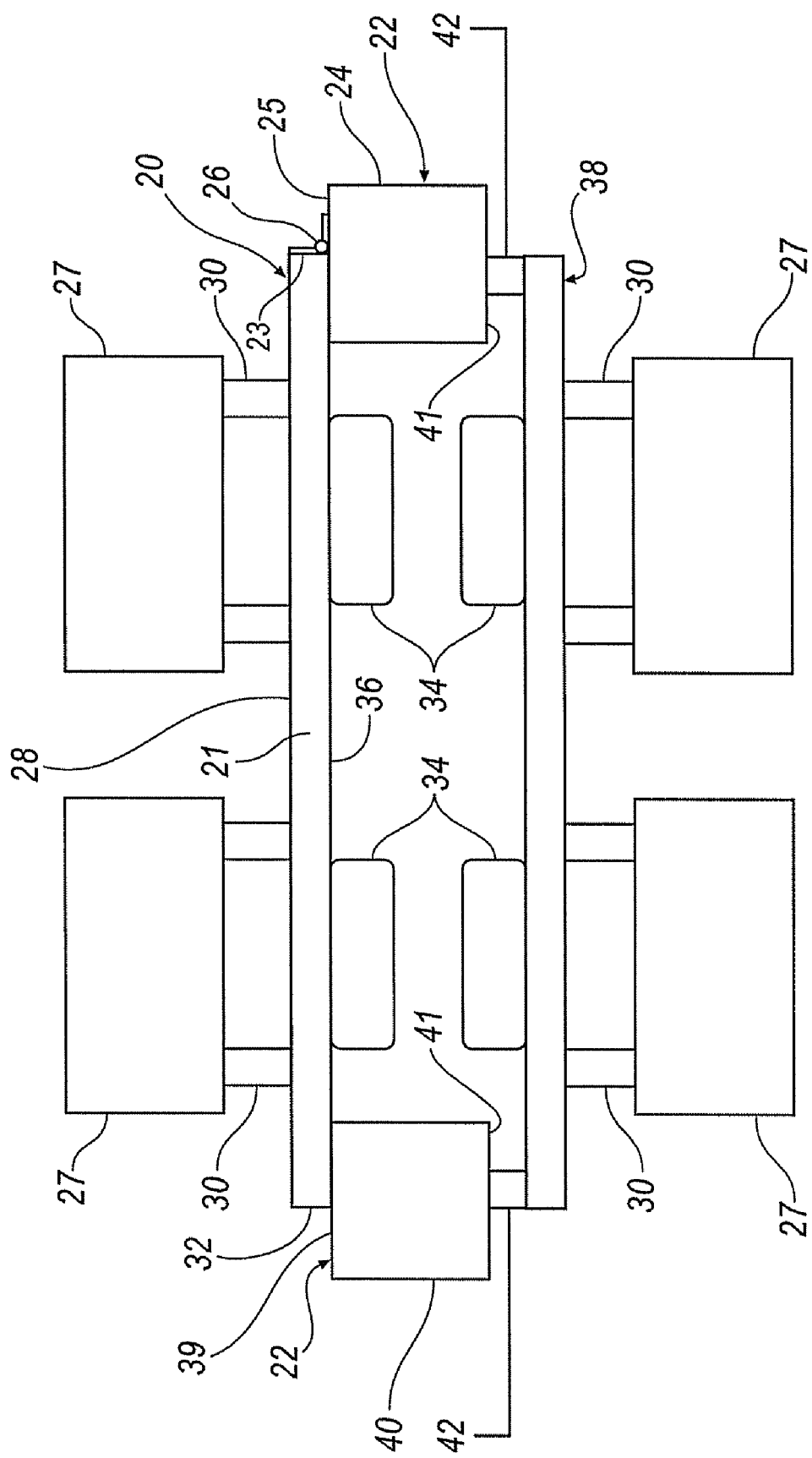
FIG. 3 is a schematic plan view of an embodiment of the present mounting structure, showing a pivotable backboard supporting a pair of ONTs and a corresponding pair of BBUs, and a fixed backboard also supporting a pair of ONTS and a corresponding pair of BBUs.

Referring particularly to the schematic plan view represented in FIG. 3, there is shown at 20 a mounting structure at a first or front side of a relay rack 22 of well-known standard construction, which includes a first upright post 24. Mounting structure 20 includes a front mounting plate or backboard 21, preferably formed of metal. Front backboard 21 is pivotably secured at a proximal end 23 thereof to a front side 25 of first upright post 24 by a hinge 26. The hinge permits backboard 21 to be rotated about a vertical axis from its closed position, represented in FIG. 3, to open positions, such as that shown for example in FIG. 6, by selectively moving a distal end 32 of backboard 21 away from a front side 39 of a second upright post 40 of relay rack 22.

A pair of ONTs 27 is mounted on an outer side 28 of front backboard 21 by a plurality of pins 30 or other fasteners. A corresponding pair of BBUs 34 is mounted on a rear or inner side 36 of backboard 21, each BBU being in electrical communication with a respective one of the pair of ONTs 27. It should be noted that backboard 21 may be so dimensioned horizontally as to carry only one ONT and only one corresponding BBU, rather than a pair of each, or it may be dimensioned vertically to carry two or more pairs of ONTs and corresponding pairs of BBUs.

A rear mounting plate or backboard 38 is also preferably formed of metal and is affixed to rear sides 41 of both upright posts 24 and 40 of relay rack 22 by a plurality of offsets 42. Rear backboard 38 also carries a pair of ONTs 27 and corresponding BBUs 34. It is to be noted that the BBUs 34 carried by front backboard 21 and those carried by rear backboard 38 are in confronting relationship when front backboard 21 is in its closed position. Though rear backboard 38 is shown to be immoveable relative to relay rack 22, it too may be pivotably secured in the manner of front backboard 21 to either upright post 22 or upright post 40 for movement between open and closed positions.

Figure 2:
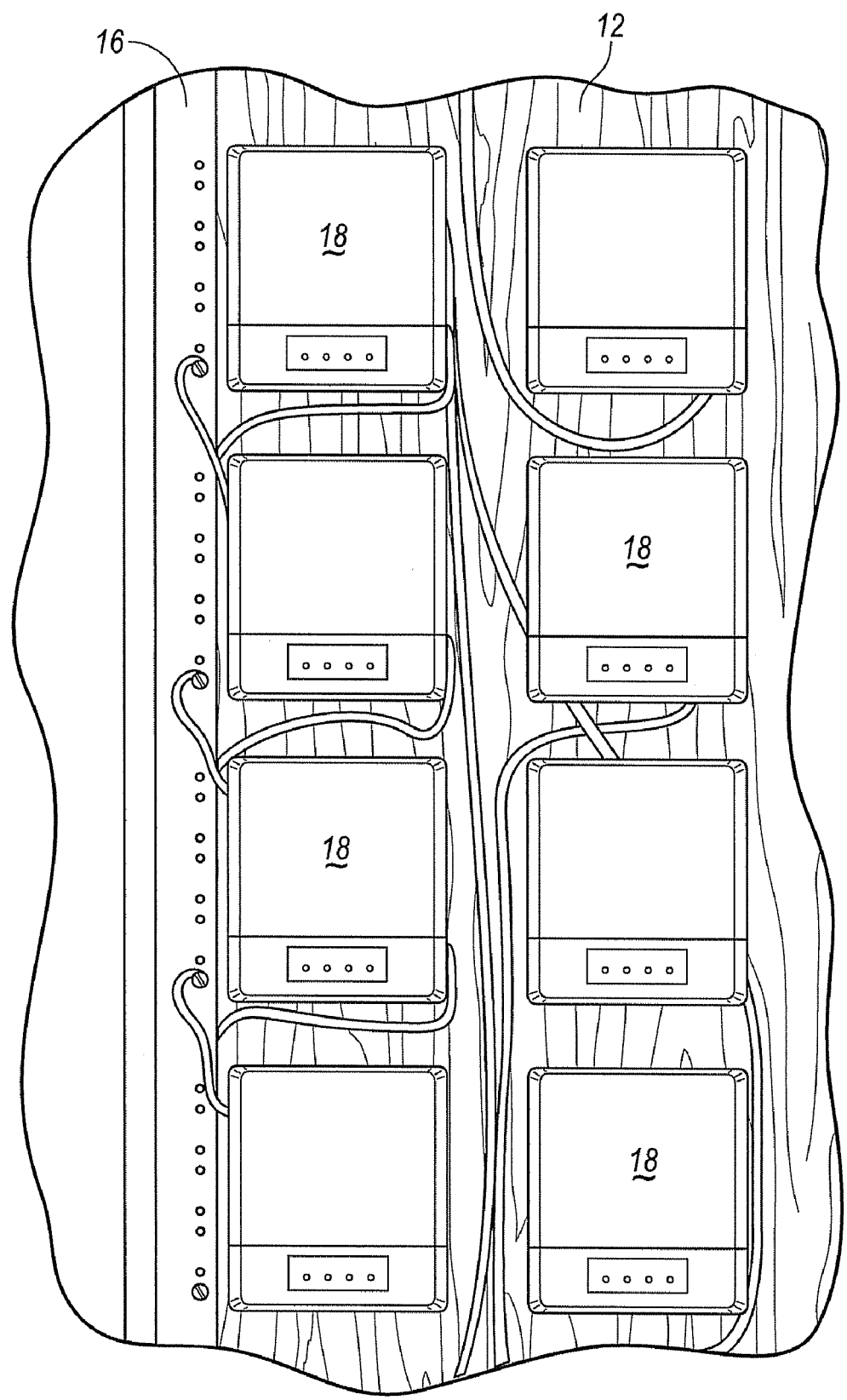
FIG. 2 is a partial elevational view of a typical prior-art BBU installation, showing a plurality of BBUs secured to a second side of the wooden backboard of FIG. 1.

It will be apparent that the pivotable securement of front backboard 21 to relay rack 22, permitting front backboard 21 to be rotated to open positions, provides ready access to BBUs 34 carried by both backboards 21 and 38 and doubles the ONT and BBU capacity of relay rack 22 relative to that permitted by the prior art, as represented, for example, in FIGS. 1 and 2.

Figure 4:
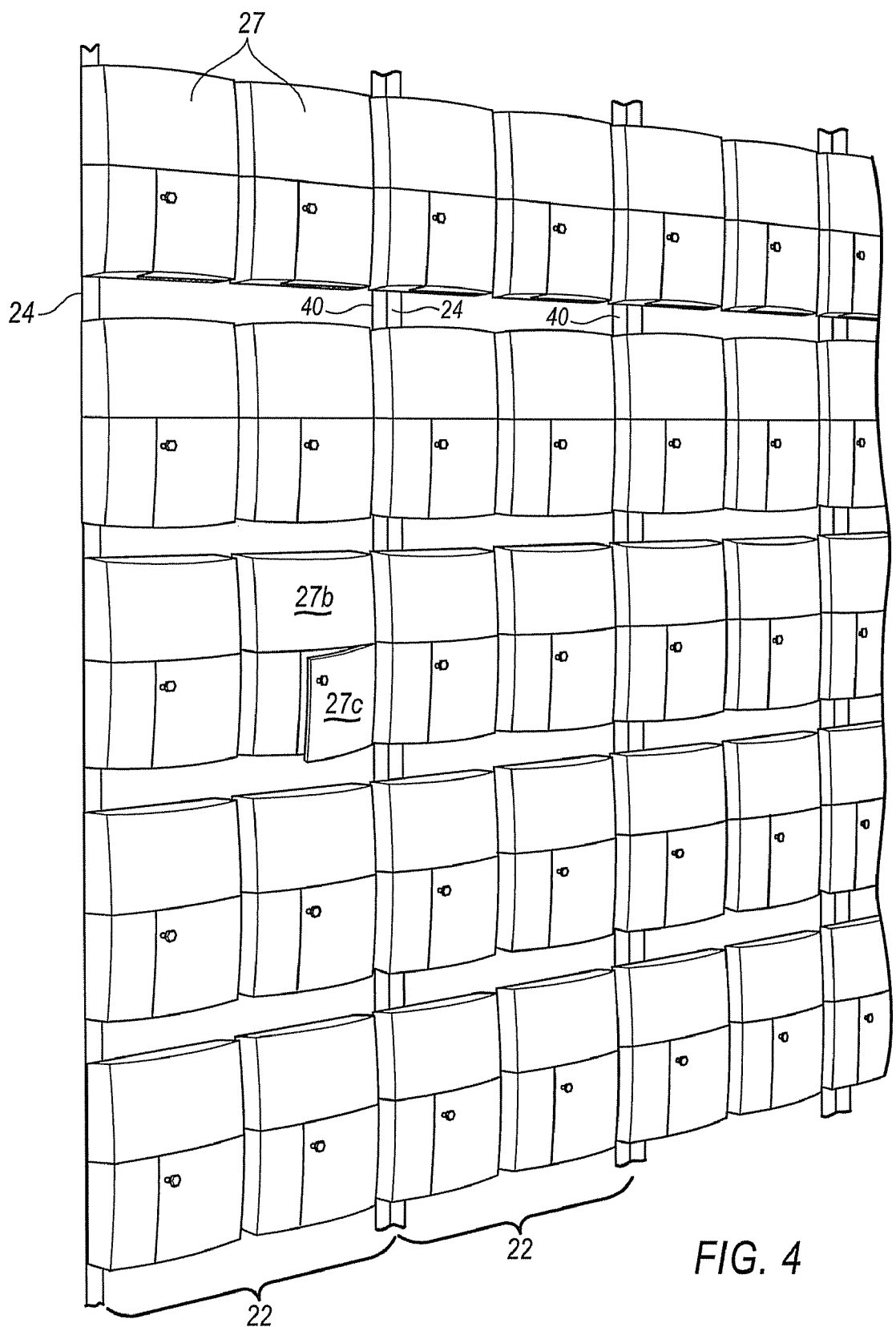
FIG. 4 is a partial perspective view of an array of ONTs carried in pairs by the present mounting structure and secured to a plurality of relay racks.

FIG. 4 shows an array of one type of ONTs 27 mounted on a series of relay racks 22. Each horizontal pairing of ONTs 27 between respective upright posts 24 and 40 is mounted in the manner described above in conjunction with FIG. 3. One ONT 27b is shown in FIG. 4 with an access door 27c thereof ajar.

Figure 5:
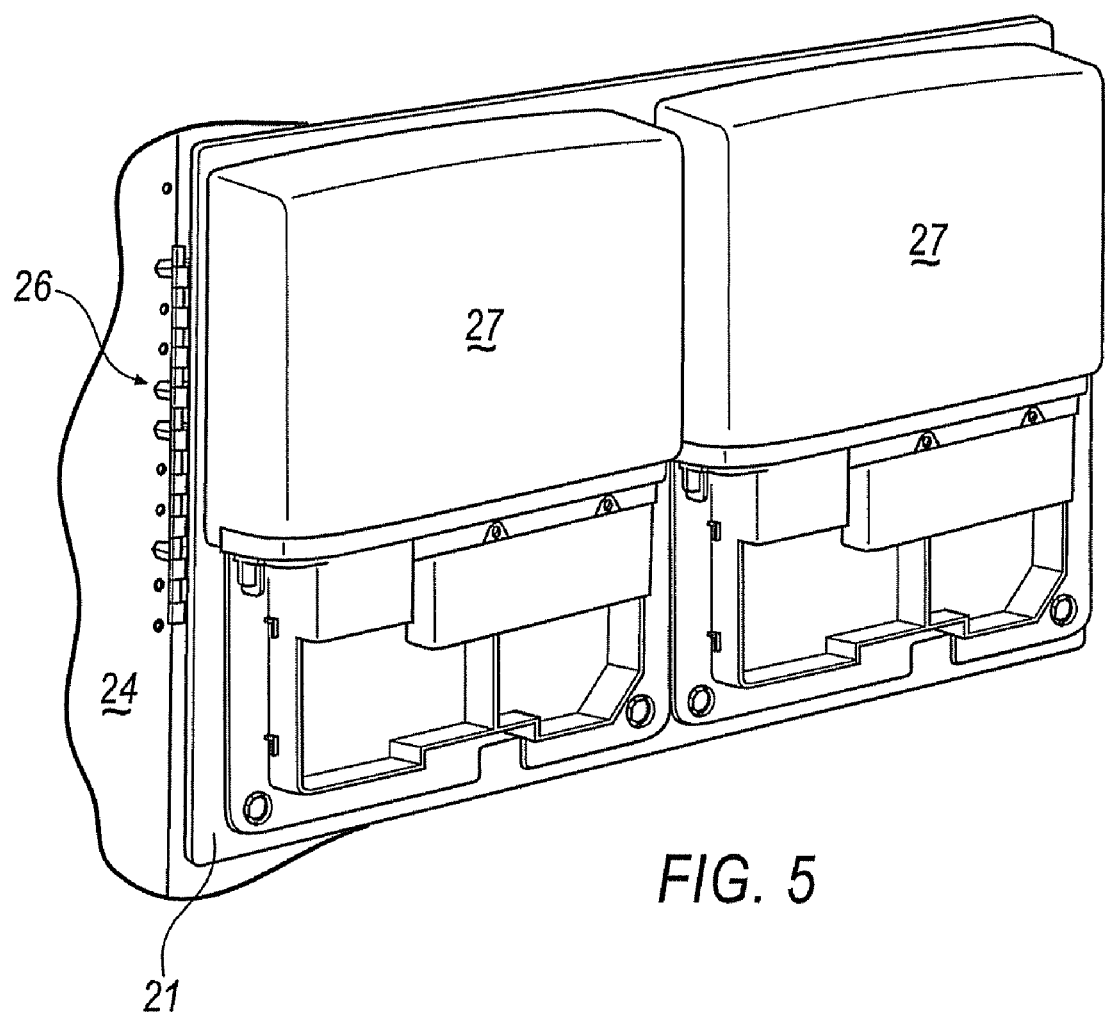
FIG. 5 is a perspective view of the present mounting structure carrying a pair of ONTs.

FIG. 5 shows backboard 21 with a pair of ONTs 27 mounted thereon, and hinge 26 pivotably connecting backboard 21 with upright post 24.

Figure 6:
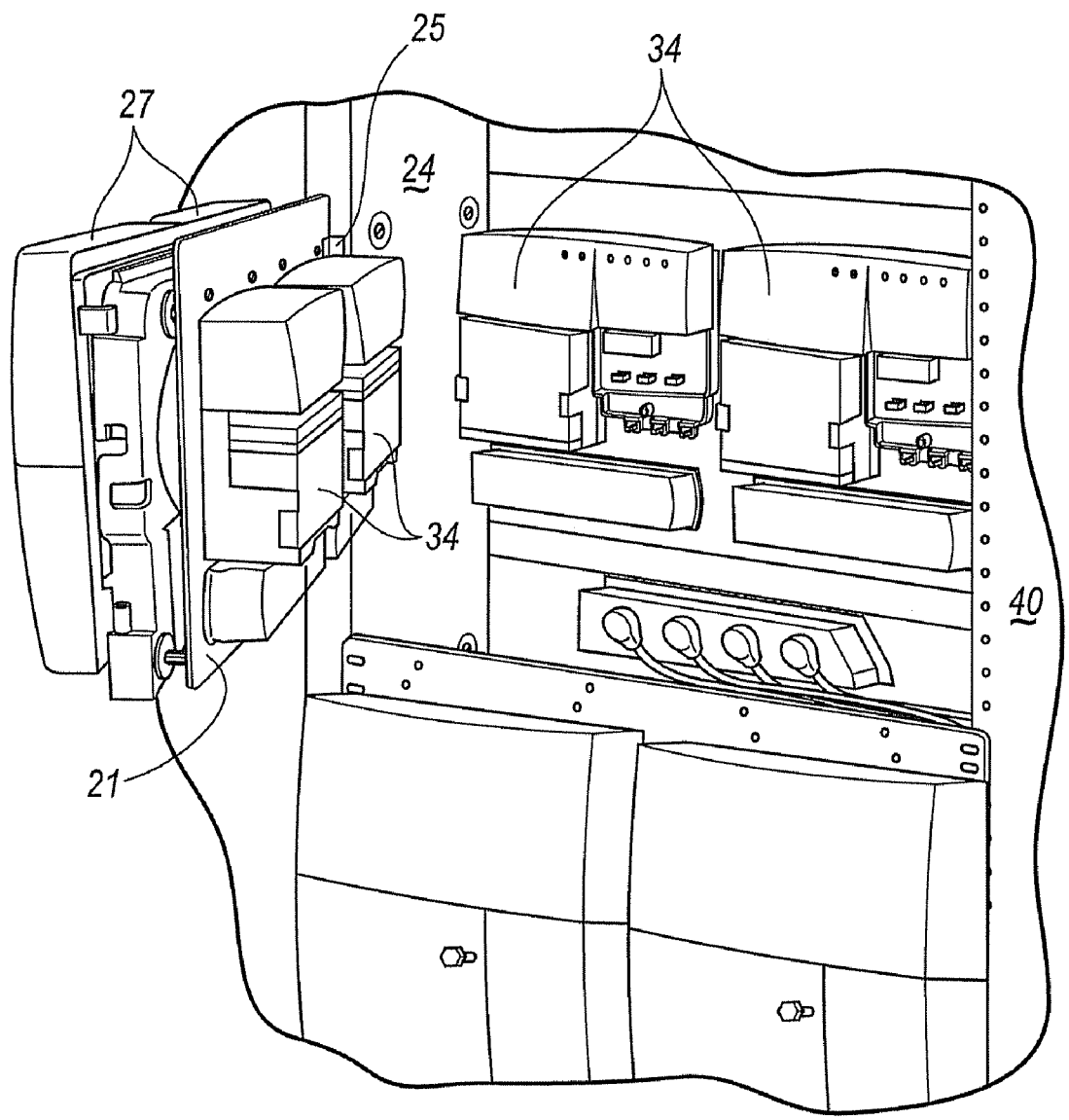
FIG. 6 is a partial perspective view of a plurality of ONTs, showing, in a partially open position, the present mounting structure carrying a pair of ONTs and a corresponding pair of BBUs, and also showing a second pair of BBUs exposed by the mounting structure when in an open position.

FIG. 6 shows backboard 21 in an open position.

Figure 7:
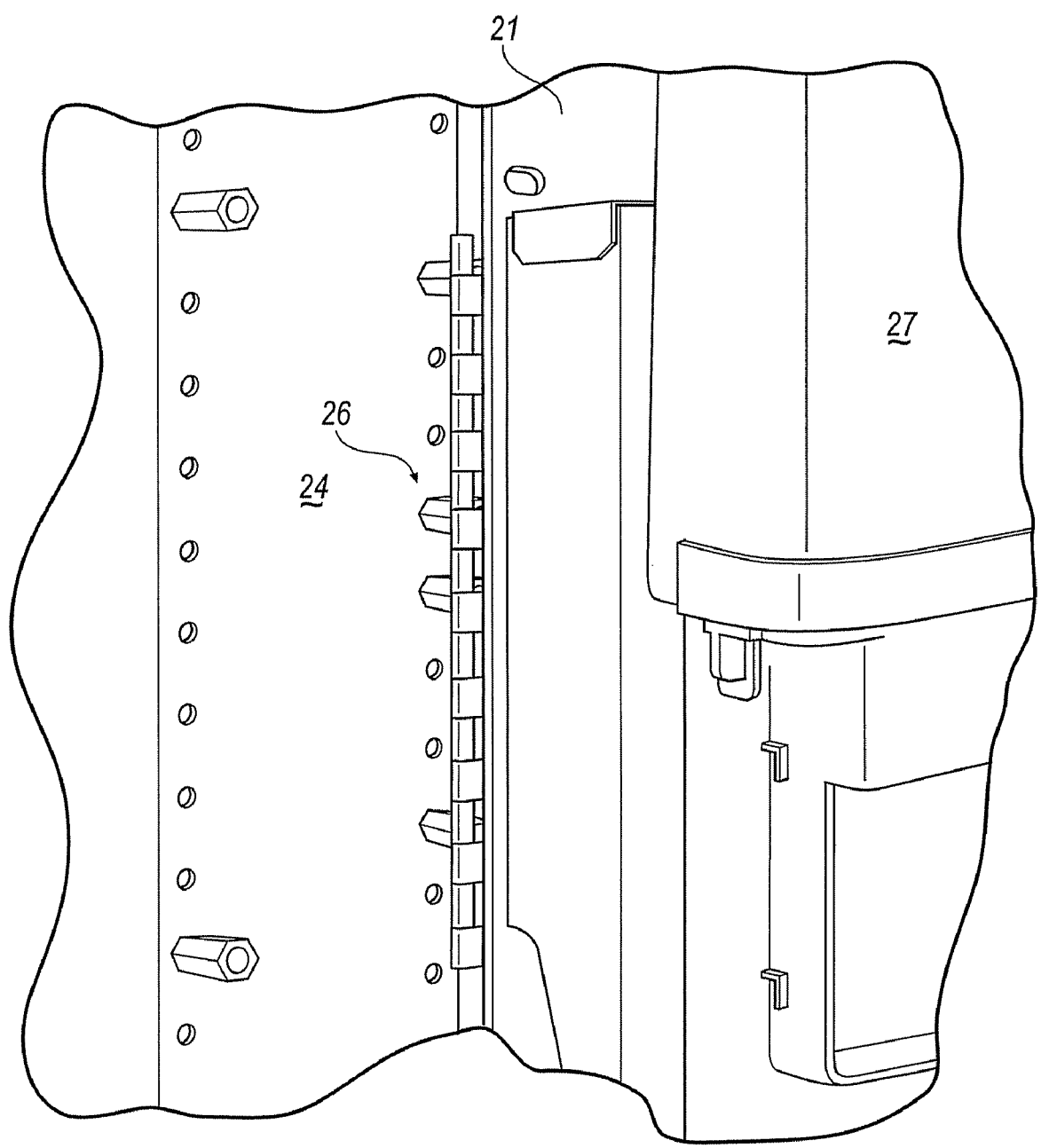
FIG. 7 is a partial perspective view of a front side of the present mounting structure, showing one of the ONTs carried thereby and a hinge arrangement thereof.

FIG. 7 shows details of hinge 26 as viewed from the front or outer side of backboard 21.

Figure 8:
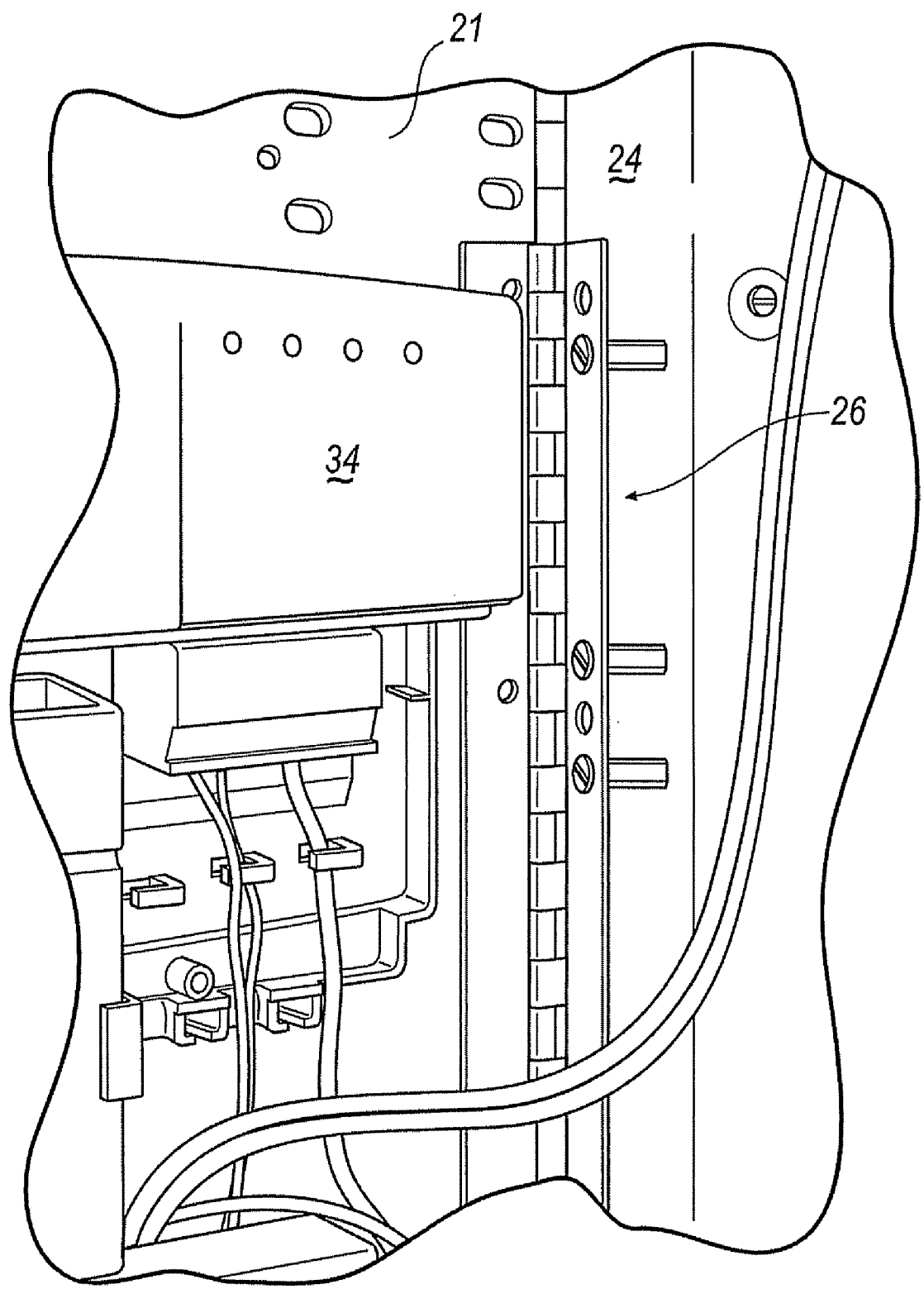
FIG. 8 is a partial perspective view of a rear side of the present mounting structure of FIG. 7, showing one of the BBUs carried thereby and another aspect of the hinge arrangement.

FIG. 8 shows details of hinge 26 as viewed from the rear of inner side of backboard 21.

Figure 9:
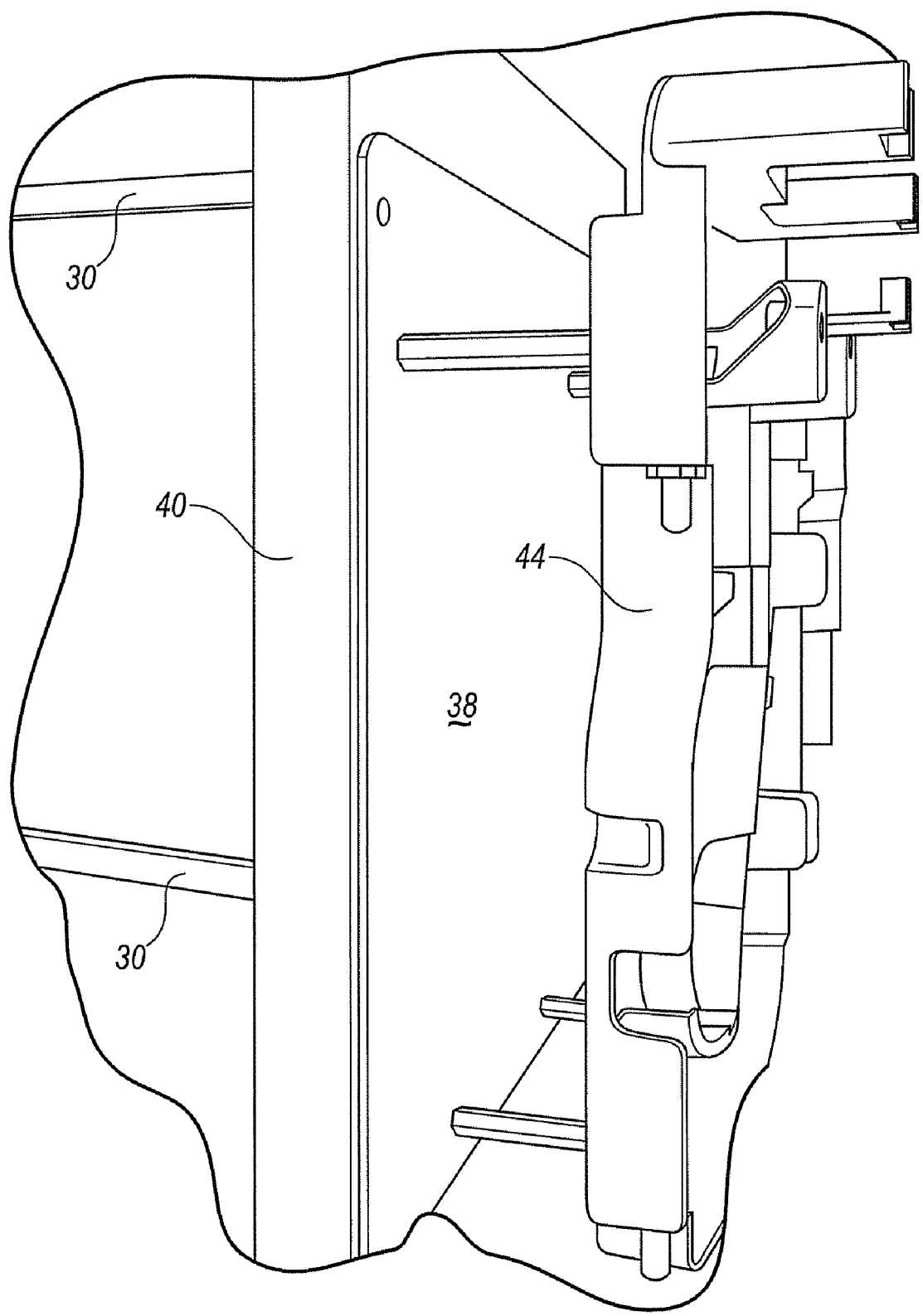
FIG. 9 is a partial perspective view of the present mounting structure, showing a backboard thereof and a support housing for an ONT.

FIG. 9 shows rear backboard 38 secured to upright post 40. A support fixture 44 is secured to an end of backboard 38 for receiving and mounting an ONT (not shown in FIG. 10).

Figure 10:
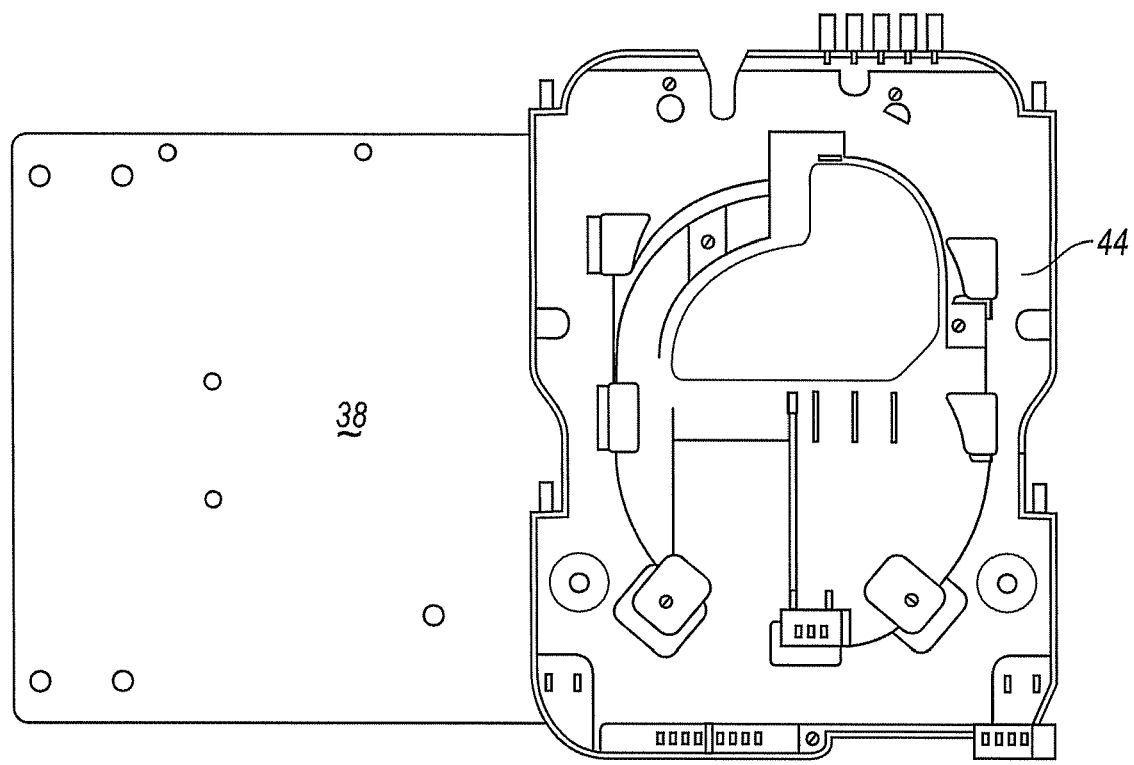
FIG. 10 is a front elevational view of a backboard thereof, and mounted thereon a support housing for an ONT.

FIG. 10 shows rear backboard 38 in elevation with support fixture 44 secured thereto at an end of backboard 38 opposite the end of backboard 38 shown in FIG. 10. Front backboard 21 is identical to rear backboard 38.

The arrangement described above and shown in the drawings provides an installation in which all the ONTs face outwardly of the relay rack for access during testing and troubleshooting. The BBUs on both sides of the relay rack face inwardly thereof for access when one or both backboards are moved to an open position.

While the mounting structure has been described with reference to an exemplary approach, this is by way of illustration and not of limitation, and the appended claims should be construed as broadly as the prior art will permit.

What is claimed is:

1. A mounting structure comprising:
   a relay rack having at least two upright posts,
   a hinge secured to a front side of one of said upright posts, and
   a first backboard for mounting electrical units including at least one electrically operable unit mounted on an outer side of said first backboard relative to said relay rack, and at least one electric power unit mounted on an inner side of said first backboard relative to said relay rack, said electrically operable unit and said electric power unit being in electrical communication with each other,
   said first backboard being secured to said hinge for selective movement relative to said relay rack between a closed position and open positions.

2. A mounting structure according to claim 1, wherein said electrically operable unit is an optical network terminal.

3. A mounting structure according to claim 1, wherein said electric power unit is a battery backup unit.

4. A mounting structure according to claim 1, wherein said electrically operable unit is an optical network terminal and said electric power unit is a battery backup unit.

5. A mounting structure according to claim 1, including a second backboard for mounting electrical units, said second backboard being secured to a rear side of at least one of said upright posts opposite said first backboard.

6. A mounting structure according to claim 1, including a second backboard for mounting electrical units, said second backboard being secured to a rear side of each of said upright posts opposite said first backboard, whereby said second backboard is fixed relative to said relay rack.

7. A mounting structure according, to claim 1, including a second backboard secured to a rear side of at least one of said upright posts opposite said first backboard, a second electrically operable unit mounted on an outer side of said second backboard relative to said relay rack, and a second electric power unit mounted on an inner side of said second backboard relative to said relay rack, said second electrically operable unit and said second electric power unit being in electrical communication with each other.

8. A mounting structure according to claim 7, wherein said first and second electrically operable units are optical network terminals and said first and second electric power units are battery backup units.

9. A mounting structure according to claim 1, including at least a pair of electrically operable units mounted on an outer side of said first backboard relative to said relay rack.

10. A mounting structure according to claim 9, wherein said electrically operable units are optical network terminals.

11. A mounting structure according to claim 1, including at least a pair of electric power units mounted on an inner side of said first backboard relative to said relay rack.

12. A mounting structure according to claim 11, wherein said electric power units are battery backup units.

13. A mounting structure according to claim 1, including at least two first electrically operable units mounted on an outer side of said first backboard relative to said relay rack, at least two first electric power units mounted on an inner side of said first backboard relative to said relay rack, each of said first electrically operable units being in electrical communication with a respective one of said first electric power units, a second backboard secured to a rear side of at least one of said upright posts opposite said first backboard, at least two second electrically operable units mounted on an outer side of said second backboard relative to said relay rack, and at least two second electric power units mounted on an inner side of said second backboard relative to said relay rack, each of said second electrically operable units being in electrical communication with a respective one of said second electric power units.

14. A mounting structure according to claim 13, wherein said first and second electrically operable units are optical network terminals and said first and second electric power units are battery backup units.

15. A test-bed installation comprising:
a relay rack having a pair of upright posts,
a plurality of vertically aligned first backboards, each of said first backboards being pivotally secured to a front side of one of said upright posts for movement between a closed position and open positions relative to said relay rack,
a plurality of vertically aligned second backboards, each of said second backboards being secured to a rear side of at least one of said upright posts in opposed relationship with a respective one of said first backboards,
a pair of optical network terminals mounted on an outer side of each of said first and second backboards relative to said relay rack, and
a pair of battery backup units mounted on an inner side of each of said first and second backboards relative to said relay rack,
whereby when one of said first backboards is moved to an open position, access is provided to the pair of battery backup units mounted on said one first backboard so moved and to the pair of battery backup units mounted on the opposing second backboard.

\* \* \* \* \*